US012286788B2

(12) United States Patent
Zhou et al.

(10) Patent No.: US 12,286,788 B2
(45) Date of Patent: Apr. 29, 2025

(54) MODULAR PRE-WIRED DWELLING PANEL DESIGN

(71) Applicant: Wall to Wall, LLC, Hayward, CA (US)

(72) Inventors: Lisong Zhou, San Mateo, CA (US); Amit Haller, Belmont, CA (US)

(73) Assignee: Wall to Wall, LLC, Hayward, CA (US)

( * ) Notice: Subject to any disclaimer, the term of this patent is extended or adjusted under 35 U.S.C. 154(b) by 218 days.

(21) Appl. No.: 17/109,971

(22) Filed: Dec. 2, 2020

(65) Prior Publication Data
US 2021/0164227 A1 Jun. 3, 2021

Related U.S. Application Data

(60) Provisional application No. 63/005,708, filed on Apr. 6, 2020, provisional application No. 62/943,171, filed on Dec. 3, 2019.

(51) Int. Cl.
*E04C 2/52* (2006.01)
*E04B 2/00* (2006.01)
*H02G 3/38* (2006.01)

(52) U.S. Cl.
CPC .................. *E04C 2/52* (2013.01); *E04C 2/46* (2013.01); *H02G 3/281* (2013.01); *H02G 3/288* (2013.01)

(58) Field of Classification Search
CPC .. E04C 2/46; E04C 2/52; H02G 3/281; H02G 3/288
(Continued)

(56) References Cited

U.S. PATENT DOCUMENTS 2,653,357 A * 9/1953 Sanders .................... E03C 1/01
52/34
3,221,454 A 12/1965 Giulio
(Continued)

FOREIGN PATENT DOCUMENTS

DE 202008007139 U1 10/2009
WO WO 2008/004896 A2 1/2008

OTHER PUBLICATIONS

PCT International Search Report and Written Opinion, PCT Application No. PCT/US2022/054012, Jun. 6, 2023, 13 pages.
(Continued)

*Primary Examiner* — James J Buckle, Jr.
(74) *Attorney, Agent, or Firm* — Morrison & Foerster LLP

(57) ABSTRACT

Prefabricated wall panels simplify the constructive of dwelling units and other structures. The wall panels include an electrical junction that enables the wall panels to couple to other wall panels, allowing electricity to flow between panels. Each wall panel includes electrical conduit to allow for the flow of electricity within the wall panel. The electrical conduit is coupled to power outlets within the wall panels. In some embodiments, the wall panels additional include network line, enabling the flow of data between panels. The electrical conduit can transmit both power and data within the conduit. In such embodiments, a controller can decode the data signals from the power signals within the conduit. The wall panel can additionally include one or more components that can perform functions based on the data, or that can couple to devices or systems that can communicate via the conduit.

10 Claims, 12 Drawing Sheets

(58) Field of Classification Search
USPC .......................................................... 52/220.2
See application file for complete search history.

(56) References Cited

U.S. PATENT DOCUMENTS

| | | | |
|---|---|---|---|
| 3,694,973 A * | 10/1972 | Unger | E04C 2/521 |
| | | | 52/125.4 |
| 3,766,574 A * | 10/1973 | Smid, Jr. | E04C 2/521 |
| | | | 4/663 |
| 3,774,631 A * | 11/1973 | Willkins | F16L 1/10 |
| | | | 137/357 |
| 3,978,529 A | 9/1976 | Krafft | |
| 3,993,139 A | 11/1976 | Vaughn | |
| 4,151,882 A | 5/1979 | Baker et al. | |
| 4,513,545 A * | 4/1985 | Hopkins, Jr. | E04H 1/02 |
| | | | 52/745.03 |
| 4,919,164 A * | 4/1990 | Barenburg | E03C 1/01 |
| | | | 137/15.08 |
| 5,076,310 A | 12/1991 | Barenburg | |
| 5,519,971 A | 5/1996 | Ramirez | |
| 5,675,194 A * | 10/1997 | Domigan | H02G 3/00 |
| | | | 361/627 |
| 5,724,773 A | 3/1998 | Hall | |
| 6,415,870 B1 | 7/2002 | Matsuoka | |
| 7,647,981 B2 | 1/2010 | Grant | |
| 8,172,588 B2 * | 5/2012 | Johnson | H02G 3/00 |
| | | | 439/215 |
| 8,172,589 B2 * | 5/2012 | Johnson | H01R 25/16 |
| | | | 439/215 |
| 8,215,065 B2 | 7/2012 | Gallant | |
| 8,978,324 B2 * | 3/2015 | Collins | E04C 2/521 |
| | | | 52/404.1 |
| 9,441,357 B1 | 9/2016 | Vafaee | |
| 9,455,561 B2 * | 9/2016 | Welch | A61K 39/08 |
| 9,493,940 B2 * | 11/2016 | Collins | E04B 1/34807 |
| 9,526,933 B2 | 12/2016 | Kochelek | |
| 9,610,466 B2 | 4/2017 | Burkhart et al. | |
| 9,790,684 B2 | 10/2017 | Neumayr | |
| 9,972,985 B1 * | 5/2018 | Tannenbaum | H02G 3/06 |
| 10,077,553 B2 | 9/2018 | Neumayr | |
| 10,221,568 B2 | 3/2019 | Ljubicic Rubio | |
| 10,273,687 B1 * | 4/2019 | Walker | E04B 2/7429 |
| 10,538,905 B2 * | 1/2020 | Pirrung | E04B 5/02 |
| 10,961,710 B2 * | 3/2021 | Collins | E04C 2/521 |
| 11,207,555 B2 | 12/2021 | Subbarao | |
| 11,214,945 B2 * | 1/2022 | Lundholm | E03C 1/02 |
| 11,371,242 B2 | 6/2022 | May | |
| 11,572,691 B1 * | 2/2023 | Newton | E04C 2/46 |
| 11,585,091 B2 | 2/2023 | May | |
| 11,680,403 B2 | 6/2023 | Perez | |
| 2005/0188632 A1 * | 9/2005 | Rosen | H02G 3/388 |
| | | | 52/220.2 |
| 2005/0210764 A1 | 9/2005 | Foucher et al. | |
| 2008/0175668 A1 | 7/2008 | Haese | |
| 2010/0065287 A1 | 3/2010 | Burkhart et al. | |
| 2010/0229472 A1 | 9/2010 | Malpas | |
| 2014/0096980 A1 | 4/2014 | Dzegan | |
| 2014/0259994 A1 | 9/2014 | Lenberg | |
| 2015/0297926 A1 | 10/2015 | Dzegan | |
| 2017/0321415 A1 | 11/2017 | Vafaee | |
| 2018/0038103 A1 | 2/2018 | Neumayr | |
| 2021/0164227 A1 | 6/2021 | Zhou et al. | |
| 2022/0064935 A1 * | 3/2022 | Williams | F24F 3/167 |
| 2022/0120081 A1 | 4/2022 | Zhou | |
| 2022/0120082 A1 | 4/2022 | Zhou | |
| 2022/0186496 A1 | 6/2022 | Fidel | |

OTHER PUBLICATIONS

PCT Invitation to Pay Additional Fees, PCT Application No. PCT/US2022/054012, Mar. 14, 2023, three pages.
United States Office Action, U.S. Appl. No. 17/565,048, Feb. 21, 2023, 8 pages.
United States Office Action, U.S. Appl. No. 17/565,033, Feb. 16, 2023, 10 pages.
United States Office Action, U.S. Appl. No. 17/565,029, Feb. 16, 2023, 10 pages.
Zhou et al., U.S. Office Action dated Dec. 20, 2023, directed to U.S. Appl. No. 17/565,033; 9 pages.
Zhou et al., U.S. Office Action dated Nov. 27, 2023, directed to U.S. Appl. No. 17/565,029; 8 pages.
Zhou et al., U.S. Office Action mailed Sep. 5, 2024 directed to U.S. Appl. No. 17/565,033; 9 pages.
Zhou et al., U.S. Office Action mailed Sep. 11, 2023 directed to U.S. Appl. No. 17/565,033; 9 pages.
Zhou et al., U.S. Office Action mailed Sep. 6, 2024 directed to U.S. Appl. No. 17/565,029; 10 pages.

* cited by examiner

MODULAR PRE-WIRED DWELLING PANEL DESIGN

CROSS REFERENCE TO RELATED APPLICATIONS

This application claims priority to and the benefit of U.S. Provisional Application No. 62/943,171, filed on Dec. 3, 2019, and U.S. Provisional Application No. 63/005,708, filed on Apr. 6, 2020. The contents of each of these provisional applications are incorporated by reference herein in their entirety.

BACKGROUND

This description generally relates to modular dwelling units, and specifically to the modular pre-wired dwelling panel design of modular dwelling units.

On-site installation of electrical and plumbing components of construction projects can often delay project completion, which can burden customers with increased costs and negatively impact contractors' reputations. Further, variations in installation practices among construction professionals can reduce quality uniformity across construction projects.

SUMMARY

A modular dwelling unit is a panelized system that is composed of prefabricated panels designed for modular building of construction projects, including residential and commercial construction projects. A modular pre-wired dwelling panel design facilitates the standardization of wiring and plumbing practices across construction projects. Panels are prefabricated with a combination of electrical, network, and plumbing components and are coupled during project assembly. Prefabricated panels may be customized based on the size and configuration of the modular dwelling unit, customer preferences, construction laws, circuit requirements of individual rooms, and the like.

In some embodiments, a modular dwelling unit may include a combination of prefabricated wall panels, ceiling panels, floor panels, utility wall panels, and breaker panels. Prefabricated wall panels may include one or more electrical junctions configured to couple with adjacent prefabricated panels, such as additional prefabricated wall panels and prefabricated ceiling panels. Prefabricated wall panels may further include electrical conduits that are electrically coupled to one or more power outlets and to the electrical junctions. Prefabricated wall panels may also include additional electrical junctions coupled to network outlets (e.g., patch panels, VPN sticks, etc.) via network lines configured to enable the flow of data from the additional electrical junctions to the network outlets. The network lines may be further configured to enable the flow of electricity (e.g., low voltage electricity) to the network outlets. In some embodiments, the network outlets are communicatively coupled to a smart home hub of the modular dwelling unit through the network lines and additional electrical junctions. Prefabricated wall panels may also include plumbing pipes configured to couple to water systems of the modular dwelling unit during assembly. Examples of plumbing pipes include cold water pipes, hot water pipes, and sewage pipes. The configuration of power outlets, network outlets, and plumbing pipes within each prefabricated wall panel may vary. Further, additional prefabricated panels, such as ceiling and floor panels, may also include power outlets, network outlets, plumbing pipes, and the like.

In some embodiments, electricity flows to the power outlets of the modular dwelling unit through the electrical junctions of the ceiling panels and wall panels. The ceiling panels may include exterior electrical junctions, configured to couple to the electrical junctions of the prefabricated wall panels. The ceiling panels may further include central electrical junctions that are coupled to the exterior electrical junctions during prefabrication, and configured to couple to a breaker panel or one or more other central electrical junctions of adjacent panels during assembly of the modular dwelling unit. In some embodiments, the central electrical junctions are coupled to the breaker panel via a feeder line during ceiling installation such that electricity is configured to flow from the breaker panel to the power outlets of the modular dwelling unit. In alternative embodiments, prefabricated floor panels are configured to include exterior and central electrical junctions such that electricity flows from a feeder line of the breaker panel to the power outlets through the prefabricated floor panels.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

Figure 1:
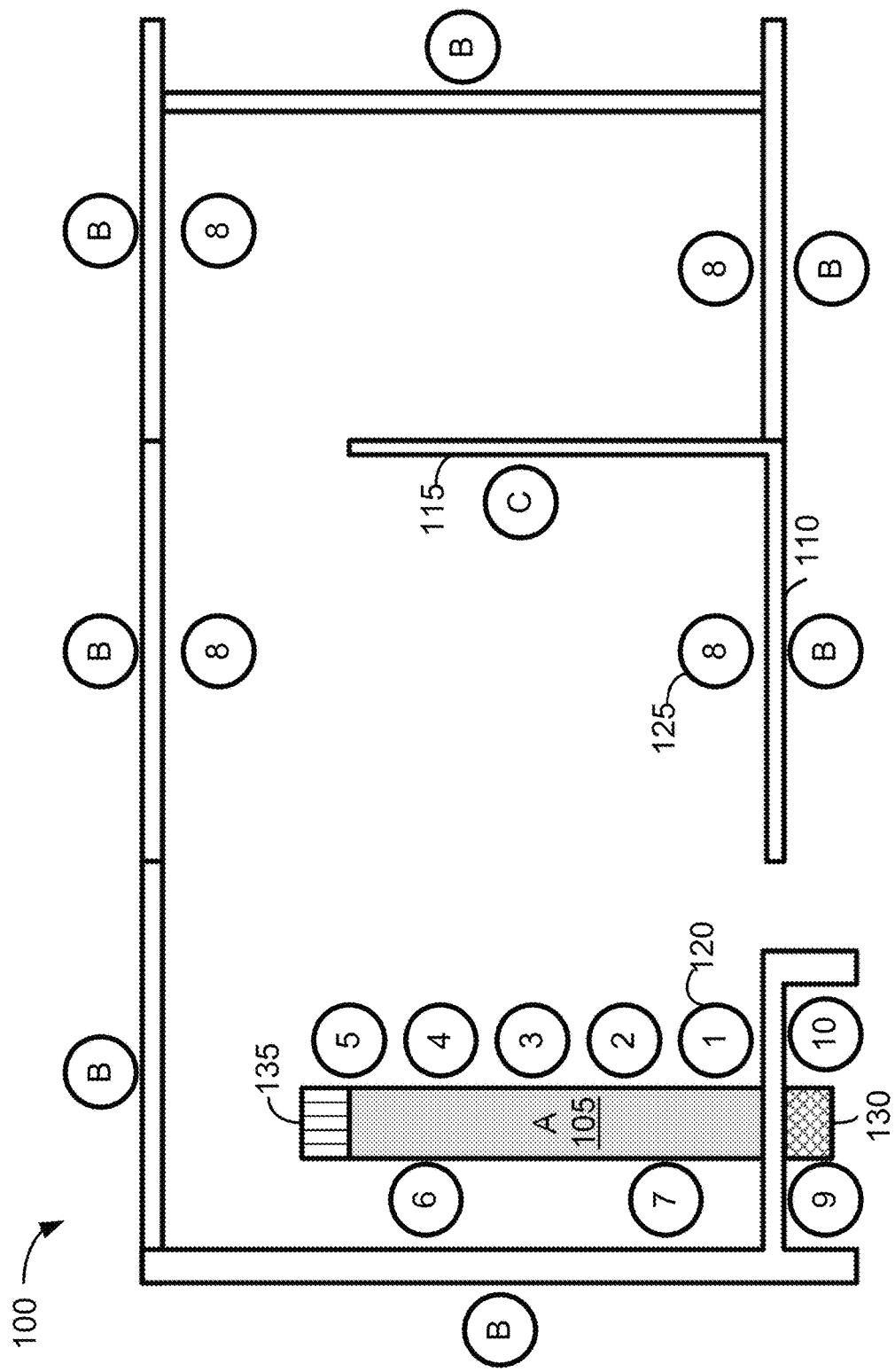
FIG. 1 illustrates a modular dwelling unit, according to one embodiment.

FIG. 1 illustrates one embodiment of a modular dwelling unit 100. A modular dwelling unit is a panelized system that is composed of prefabricated panels designed to facilitate modular building of construction projects, including residential and commercial construction projects. Prefabricated panels include utility panels (labeled with an "A"), exterior wall panels (labeled with a "B"), interior wall panels (labeled with a "C"), floor panels, ceiling panels, and the like. Prefabricated panels are assembled or manufactured prior to use in assembling a structure, and may be assembled or manufactured at a different location than the location they are used to assemble a structure. The modular dwelling unit 100 shown includes (among other panels) a utility wall panel 105, an exterior wall panel 110, and an interior wall panel 115. Each panel of the modular dwelling unit 100 is prefabricated to include a combination of electrical and plumbing components so that modular dwelling units of varying sizes and configurations can be efficiently assembled based on customer preferences, construction laws in various jurisdictions, and the room-specific circuit requirements (e.g., current, voltage, wiring location requirements, etc.).

Prefabricated panel components may include a combination of power outlets (e.g., GFCI and AFCI outlets), network outlets (e.g., network ports, controls), and plumbing pipes (e.g., cold water, hot water, sewage pipes). Power outlets may be used for various appliances and electronics of the modular dwelling unit, such as cooktops, dishwashers, garbage disposals, refrigerators, microwaves, range hoods, kitchen and bathroom receptacles, washing machines, dryers, bedroom receptacles, living room receptacles, air conditioners, water heaters, and the like. The modular dwelling unit 100 shown includes several power outlets embedded within a utility wall panel 105, including power outlet 120, a prefabricated exterior wall panel 110 with one power outlet 125, and an interior wall panel 115 without power outlets. However, the location and configuration of components within alternative modular dwelling units may vary.

Prefabricated panels may also include electrical junctions that are connected to the power outlets and/or network outlets via electrical conduits or network lines. The location and number of electrical junctions within each prefabricated panel may vary. For example, electrical junctions may be located at the top or the bottom of the prefabricated wall panels, an electrical junction may be coupled to one or more outlets, prefabricated panels may include multiple electrical junctions, and the like. An electrical junction includes a coupling interface that enables electrical and/or communicative coupling of the corresponding prefabricated panel to a reciprocal electrical junction of an adjacent prefabricated panel of the modular dwelling unit 100. In some embodiments, the electrical junctions are embedded within the prefabricated panels with coupling interfaces at locations on the surface of the prefabricated panels (for instance, along a surface of the prefabricated panels that abuts a surface of another prefabricated panel) such that when a coupling interface of a first prefabricated panel couples to a coupling interface of a second prefabricated panel, neither the coupling interfaces nor the electrical junctions are visible from within the structure. Plumbing pipes may also include coupling interfaces such that the plumping pipes are configured to couple to plumbing pipes in adjacent prefabricated wall panels, water systems, mechanical, electrical, plumbing (MEP) rooms, and the like, during assembly of the modular dwelling unit.

The modular dwelling unit 100 further includes one or more breaker panels. Breaker panels (when coupled to an exterior power source) may provide power outlets electricity through feeder lines of the breaker panel. In some embodiments, electricity flows through the feeder lines directly to the power outlets embedded within a prefabricated wall panel. For example, electricity may flow to the power outlets along utility wall panel 105 directly from a feeder line. In alternative embodiments, electricity flows from the feeder lines through one or more electrical junctions coupled to the power outlets.

The breaker panel may be located on an exterior wall of the modular dwelling unit 100, such as the first breaker panel 130. Alternatively, the breaker panel may be located on an interior wall of the modular dwelling unit 100, such as the second breaker panel 135. In some embodiments, the modular dwelling unit 100 includes more than one breaker panel.

Figure 2:
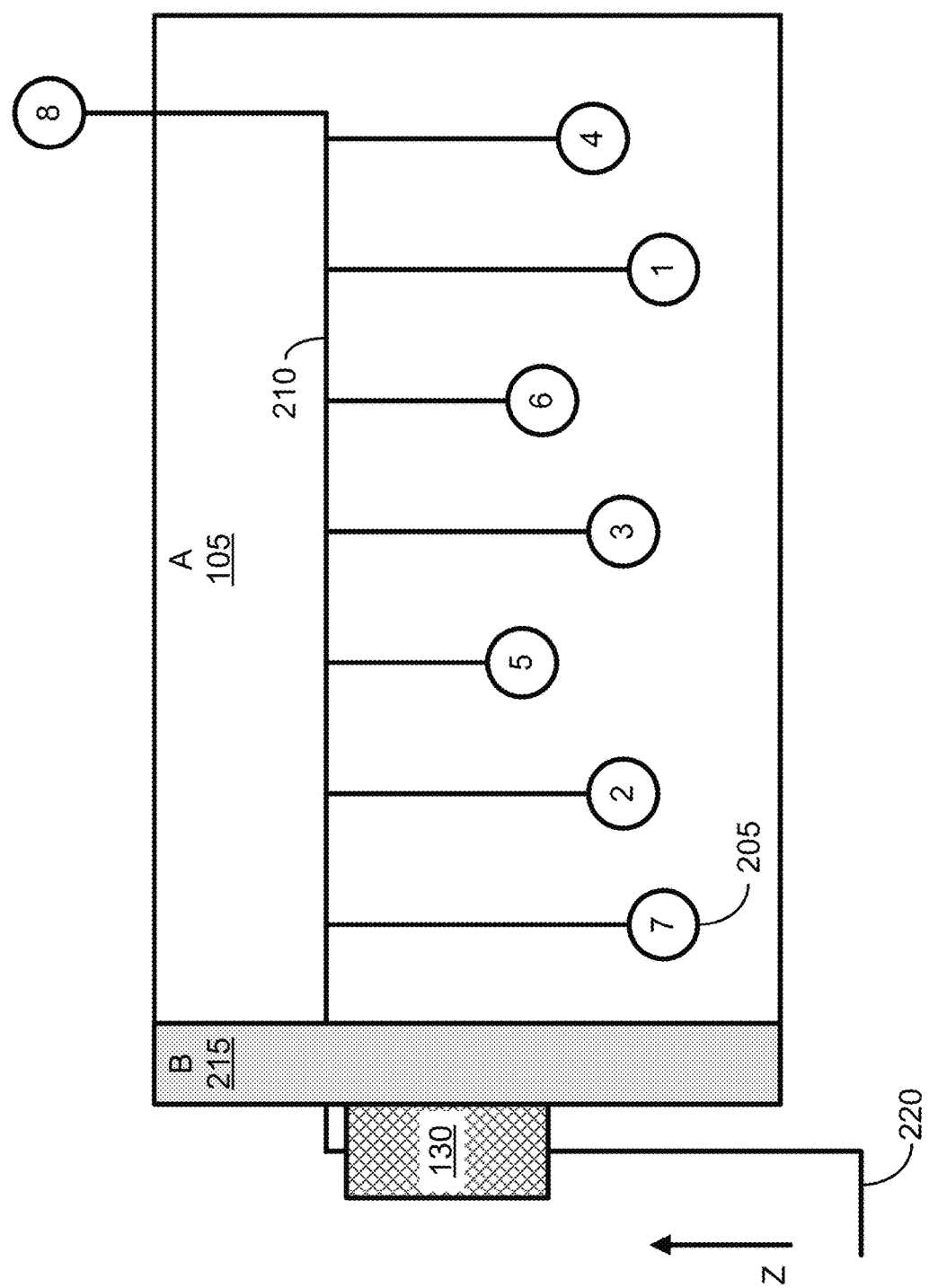
FIG. 2 illustrates a prefabricated utility wall panel, according to one embodiment.

FIG. 2 illustrates one embodiment of a prefabricated utility wall panel 105. The utility wall, when installed within the dwelling unit, extends from a floor of the dwelling unit towards a ceiling of the dwelling unit, and may extend all the way to the ceiling of the dwelling unit. The power outlets, such as power outlet 7 205, and the feeder line 210 are embedded within the utility wall panel 105 during prefabrication. Similarly, the breaker panel 130 is embedded within the exterior wall panel 215 during prefabrication. As shown, the power outlets are electrically coupled to the feeder line 210, which is configured to be electrically coupled to the breaker panel 130 upon assembly of the modular dwelling unit 100. The breaker panel 130 may include an underground feeder line 220. Alternatively, the breaker panel 130 may include an overhead feeder line, extending upwards from the utility wall towards a feeder line embedded within a ceiling panel of the dwelling unit.

Figure 3A:
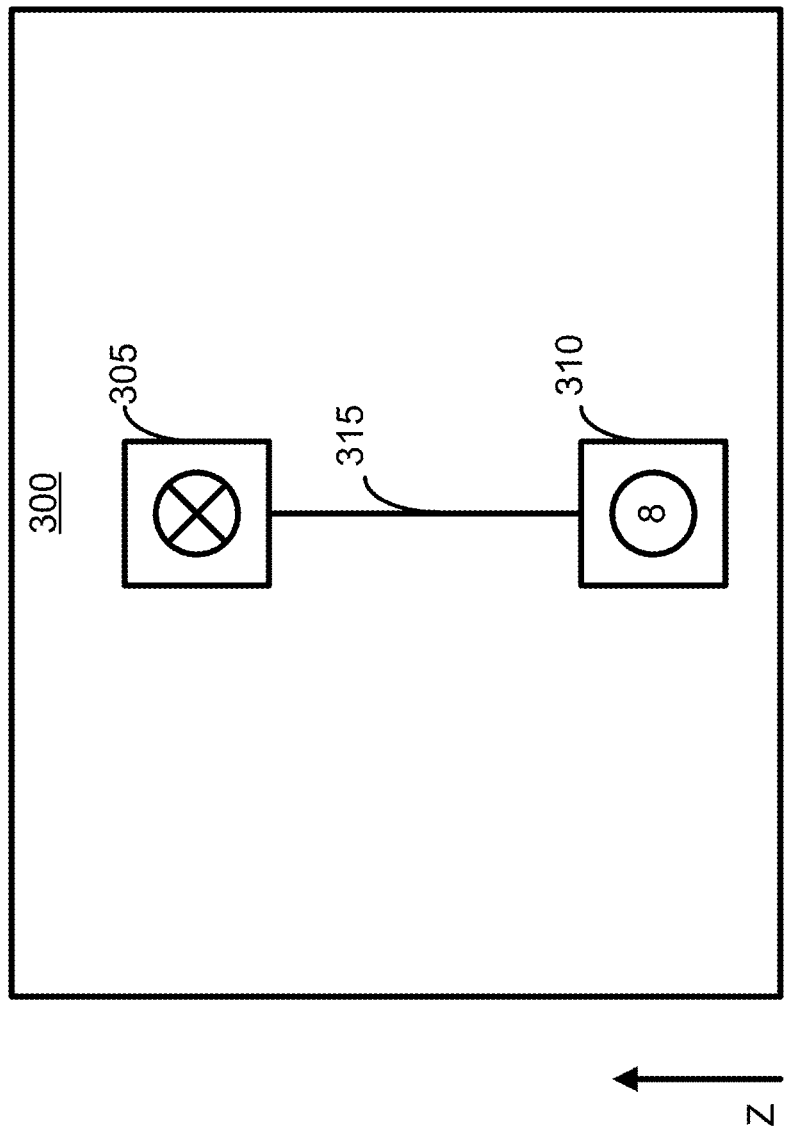
FIG. 3A illustrates a prefabricated wall panel, according to one embodiment.

FIG. 3A illustrates one embodiment of a prefabricated wall panel 300. The illustration shows the pre-wiring of a prefabricated wall panel. The prefabricated wall panel 300 includes an electrical junction 305 electrically coupled to a power outlet 310 through an electrical conduit 315. In some embodiments, holes may be cut into the frame of the prefabricated wall panel 300 for the interconnection of the electrical junction 305 and the power outlet 310. In some embodiments, the electrical junction includes a junction box (e.g., a J-box) and a connector (e.g., a z-wave relay). The power outlet 310 may include GFCI outlets, AFCI outlets, and the like. The electrical conduit may be wiring cable suitable for the amperage rating of the corresponding circuit, such as AWG 14 wiring. The electrical junction 305 may be mounted to the prefabricated wall panel 300 to meet construction requirements. For example, the electrical junction 305 may be mounted to a stud of the prefabricated wall panel 300, and the electrical conduit 315 may be secured to and run along the stud.

While the prefabricated wall panel 300 shown includes one electrical junction 305 coupled to a single power outlet 310, electrical junctions may be coupled to more than one power outlet. Further, prefabricated wall panels may include additional electrical junctions. Additional electrical junctions may be included based on the circuit requirements of the rooms enclosed by and on each side of the wall panel. For example, a first side of a prefabricated wall panel may be a wall of a bathroom with different and distinct circuit requirements than a kitchen on an opposite side of the wall. Prefabricated wall panels may also include additional electrical junctions coupled to network outlets through network lines, discussed in detail with reference to FIGS. 7-8.

Figure 3B:
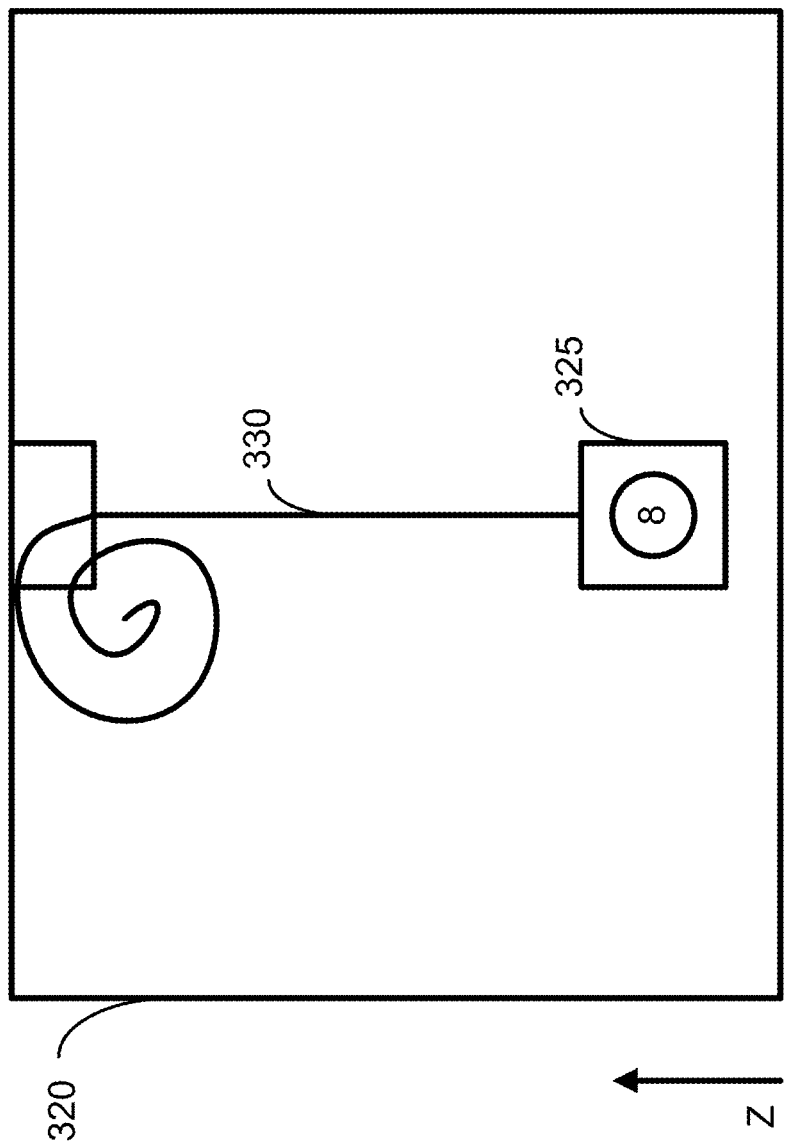
FIG. 3B illustrates an additional prefabricated wall panel, according to one embodiment.

FIG. 3B illustrates an embodiment of an additional prefabricated wall panel 320. The prefabricated wall panel 320 includes a power outlet 325 coupled to a wiring cable 330. The wiring cable 330 may be measured and cut to an appropriate length during assembly of the modular dwelling unit. The wiring cable 330 may be fed through precut holes of the prefabricated panels during assembly to electrically couple the prefabricated wall panel 320 to an adjacent prefabricated wall panel. In some embodiments, coupling the prefabricated wall panel 320 of FIG. 3B requires on-site effort not otherwise required by the prefabricated wall panel 300 of FIG. 3A.

Figure 4:
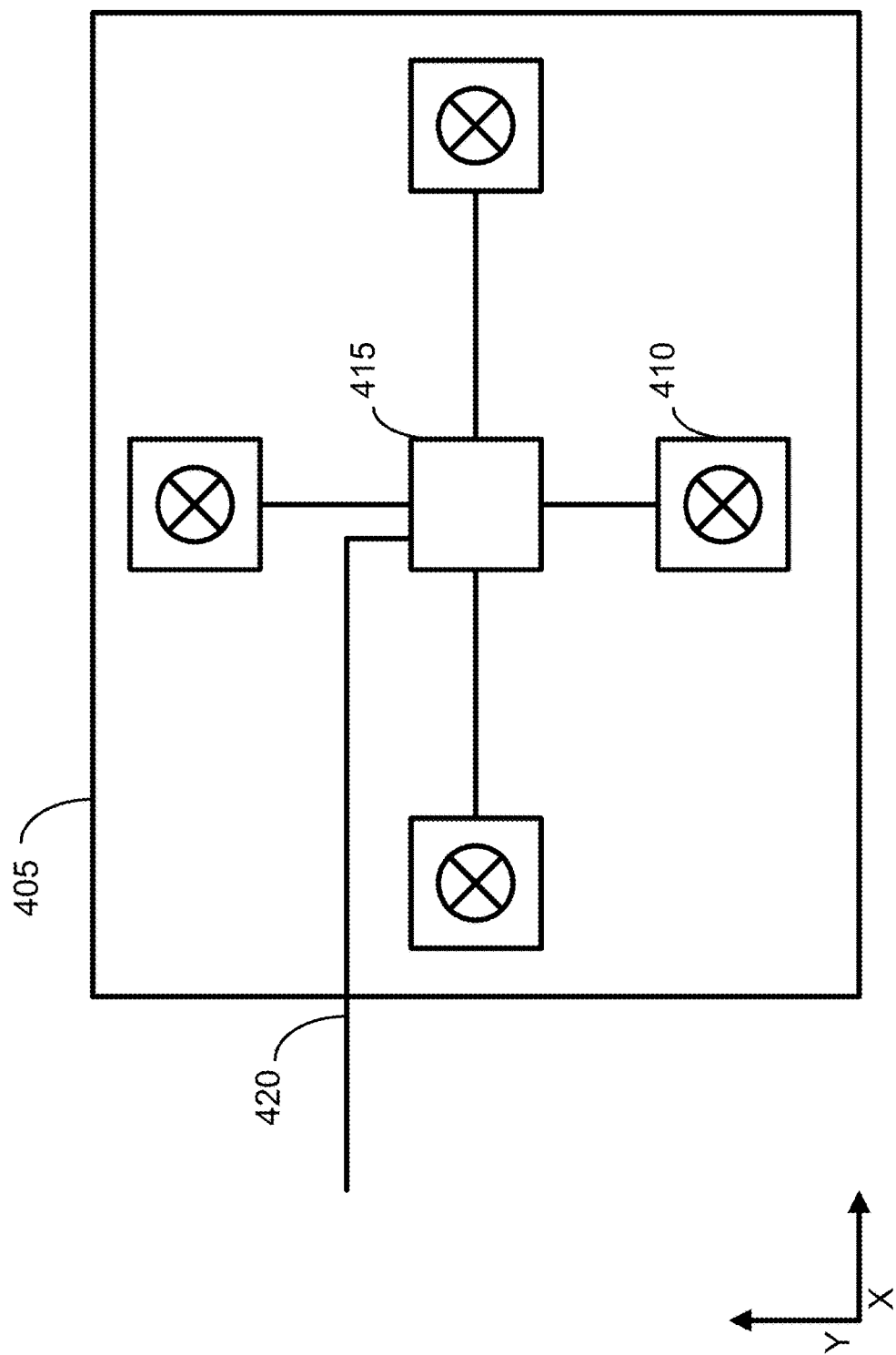
FIG. 4 illustrates a prefabricated ceiling panel, according to one embodiment.

FIG. 4 illustrates one embodiment of a prefabricated ceiling panel 405. The prefabricated ceiling panel 405 includes exterior electrical junctions, such as exterior electrical junction 410. The exterior electrical junction 410 includes a coupling interface (not shown) such that the exterior electrical junction 410 can be electrically coupled to an electrical junction of an adjacent wall panel, such as an exterior wall panel or an interior wall panel, during assembly of the modular dwelling unit.

During prefabrication, the exterior electrical junctions are electrically coupled to the central electrical junction 415 of the prefabricated ceiling panel 405. The central electrical junction 415 enables the flow of electricity from a breaker panel to the power outlets embedded within the prefabricated wall panels of the modular dwelling unit through the central electrical junction 415 and the exterior electrical junctions. In one embodiment, electricity flows from the breaker panel to the central electrical junction 415 via a loose connector wire 420 configured to be coupled to the breaker panel during assembly. The central electrical junction 415 may then distribute electricity to the exterior junctions of the ceiling panel 405. The exterior junctions of the ceiling panel facilitate the flow of electricity to the power outlets of a prefabricated wall panel through the electrical junctions of the prefabricated wall panel and the electrical conduits connecting them. The central electrical junction 415 can electrically couple to a central electrical junction of an adjacent ceiling panel, enabling a daisy-chain of consecutive adjacent ceiling panels from the breaker panel and through each ceiling panel. In alternative embodiments, exterior and central electrical junctions may be located within prefabricated floor panels of a modular dwelling unit. In these embodiments, electricity flows from the breaker panel, through the prefabricated floor panels to the power outlets of the prefabricated wall panels.

Figure 5:
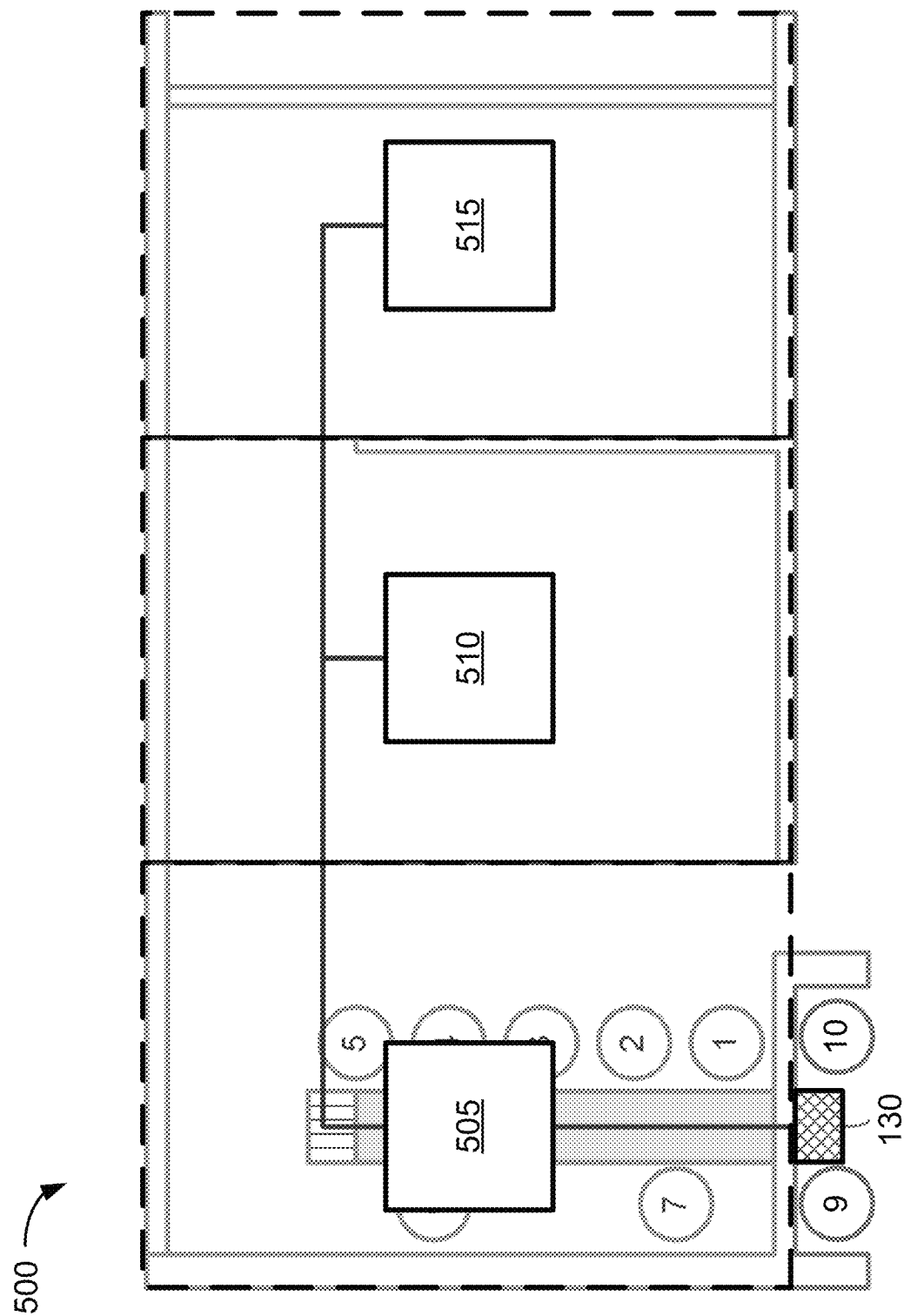
FIG. 5 illustrates a coupling of prefabricated ceiling panels of a modular dwelling unit, according to one embodiment.

FIG. 5 illustrates one embodiment of the coupling of prefabricated ceiling panels of a modular dwelling unit 500 post-ceiling installation. As discussed above with reference to FIG. 4, the central electrical junction of a ceiling panel is electrically coupled to one or more exterior junctions of the ceiling panel. During installation of the ceiling, the central electrical junctions of the prefabricated ceiling panels are electrically coupled to each other and to the breaker panel of the modular dwelling unit 500. Through these couplings, electricity can flow from the breaker panel 130 to the power outlets of the modular dwelling unit 500.

The modular dwelling unit 500 shown includes a first ceiling panel with a first central electrical junction 505. The first central electrical junction 505 is electrically coupled to the breaker panel 130. In some embodiments, a second electrical junction 510 of a second ceiling panel and a third electrical junction 515 of a third ceiling panel are serially coupled to the first central electrical junction 505. In other embodiments, the central electrical junctions may be connected in parallel, or connected in any other suitable configuration.

In some embodiments, the central electrical junction of the ceiling panel adjacent to the utility wall of the modular dwelling unit is electrically coupled to an electrical junction of the utility wall. In other embodiments, as discussed with reference to FIG. 2, the power outlets of a utility wall are directly wired to the feeder line of the breaker panel 130.

Figure 6:
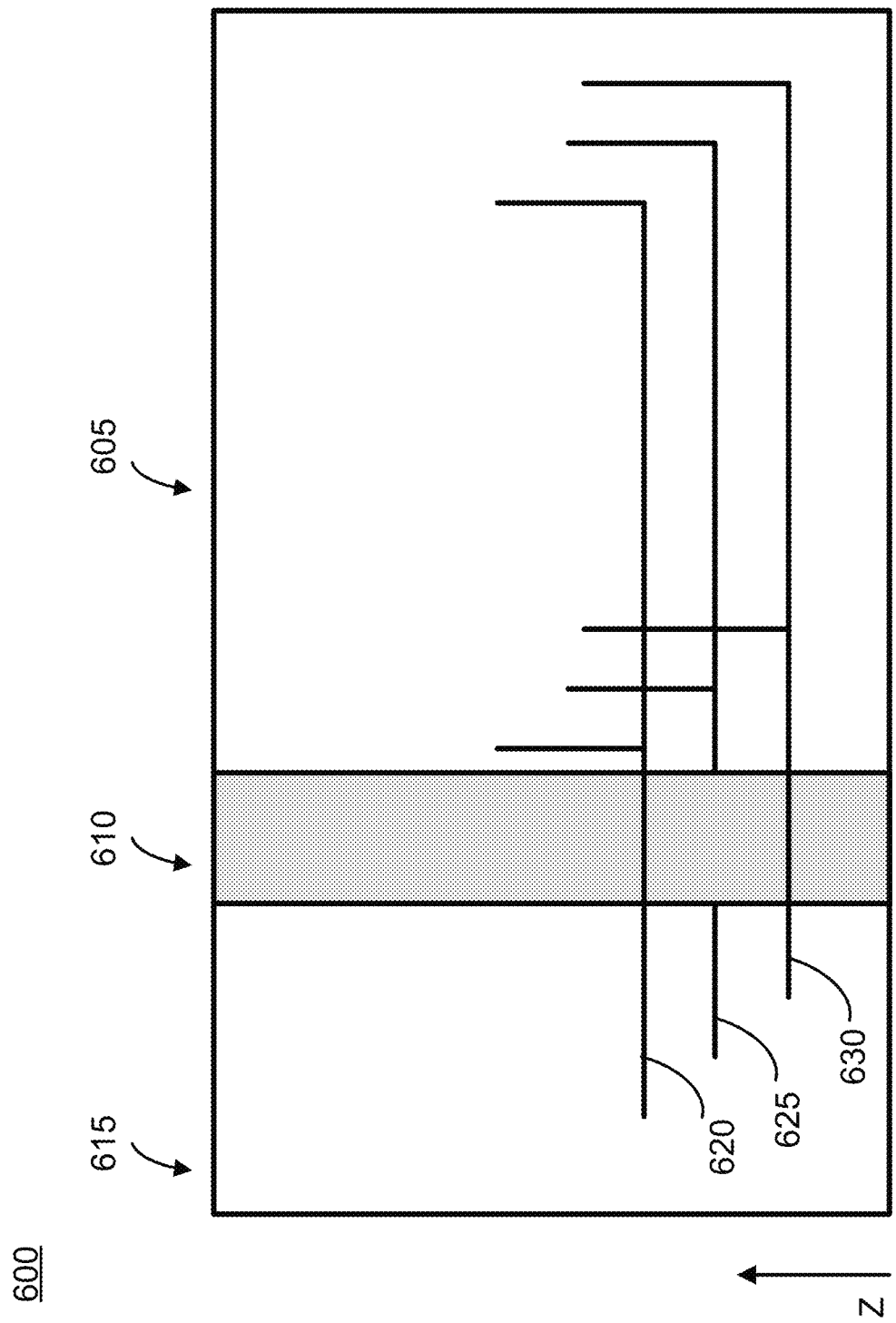
FIG. 6 illustrates plumbing pipes embedded within a prefabricated wall panel, according to one embodiment.

FIG. 6 illustrates one embodiment of plumbing pipes embedded within a prefabricated wall panel. Plumbing pipes are added to prefabricated wall panels during prefabrication. Plumbing pipes may have a coupling interface configured to couple to one or more water systems of the modular dwelling unit. For example, the illustration 600 shows plumbing pipes extending from within a prefabricated wall panel 605, through an exterior wall panel 610 into a mechanical, electrical, plumbing (MEP) room 615 of the modular dwelling unit. Plumbing pipes may also have additional coupling interfaces such that they are configured to couple with plumbing pipes in adjacent prefabricated panels, including prefabricated wall panels and prefabricated floor panels. Examples of plumbing pipes may include a cold water plumbing pipe 620, a hot water plumbing pipe 625, and a sewage plumbing pipe 630.

Figure 7:
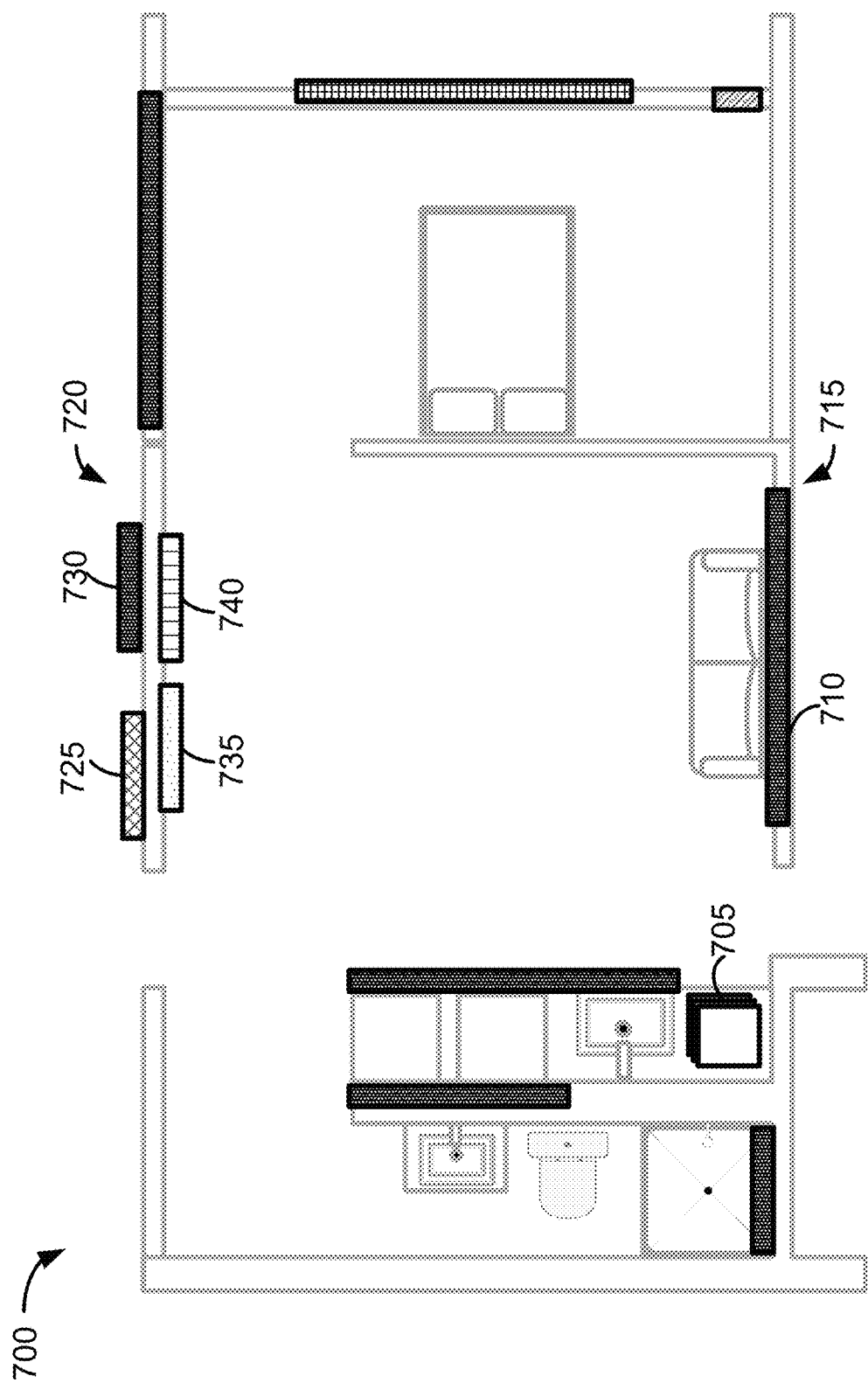
FIG. 7 illustrates a modular dwelling unit with network outlets, according to one embodiment.

FIG. 7 illustrates one embodiment of a modular dwelling unit 700 with network outlets. Network outlets may be embedded within the panels of the modular dwelling unit 700 and coupled to network lines during prefabrication. Examples of network outlets include UPSs, POE switches, NUCs, VPN sticks, Z-wave sticks, modem outlets, router outlets, P/S 24V DCs, ethernet-2-DMX, DMX decoder, patch panels, USB outlets, cat or ethernet outlets, and the like. Network outlets may be used for light fixtures, fans (e.g., exhaust fans), sensors, blinds (e.g., roller blinds), televisions, door bells, energy monitors, flow meters, etc. Network lines are configured to enable the flow of data to the network outlets from a central network hub, such as a smart home hub, and are configured to enable the flow of electricity through the network lines, for instance at a voltage lower than the voltage of the electricity that flows through the electrical conduit described above. As with the electrical outlets discussed above, network lines are coupled to additional electrical junctions of the prefabricated panels. The additional electrical junctions include connectors chosen based on the protocols of the corresponding network outlets. Examples of protocols include POE, DMX, Z-wave, RF, WIFI, and the like. The additional electrical junctions may also include coupling interfaces that enable adjacent prefabricated panels to communicatively couple during assembly of the modular dwelling unit 700.

In some embodiments, the network outlets are communicatively coupled to a smart home hub that allows users to control settings of the network connectors via one or more control panels and/or through a user device, such as a smart phone, tablet, or computer. For example, control panels may allow users to adjust the temperature of the modular dwelling unit, raise blinds, shut off lights, and the like. The number of control panels may vary based on the size and configuration of the modular dwelling unit. For example, a modular dwelling unit with three rooms may include three control panels.

The modular dwelling unit 700 shown includes a smart home hub 705 that is communicatively coupled to the network outlets. The arrangement of network outlets may vary based on the configuration of the modular dwelling unit, user preferences and habits, and the like. Network outlets may be located on prefabricated exterior wall panels, interior wall panels, ceiling panels, floor panels, etc. Similarly, network outlets may be located on either side of a prefabricated panel. For example, the lighting fixture 710 of the prefabricated exterior wall panel 715 is located on the interior side of the prefabricated panel 715. The prefabricated exterior wall panel 720 includes network connectors on both the interior and exterior sides of the prefabricated panel 720. As shown, the prefabricated exterior wall panel 720 includes a doorbell 725 and light fixture 730 on the exterior side and a control panel 735 and ethernet port 740 on the interior side.

Figure 8:
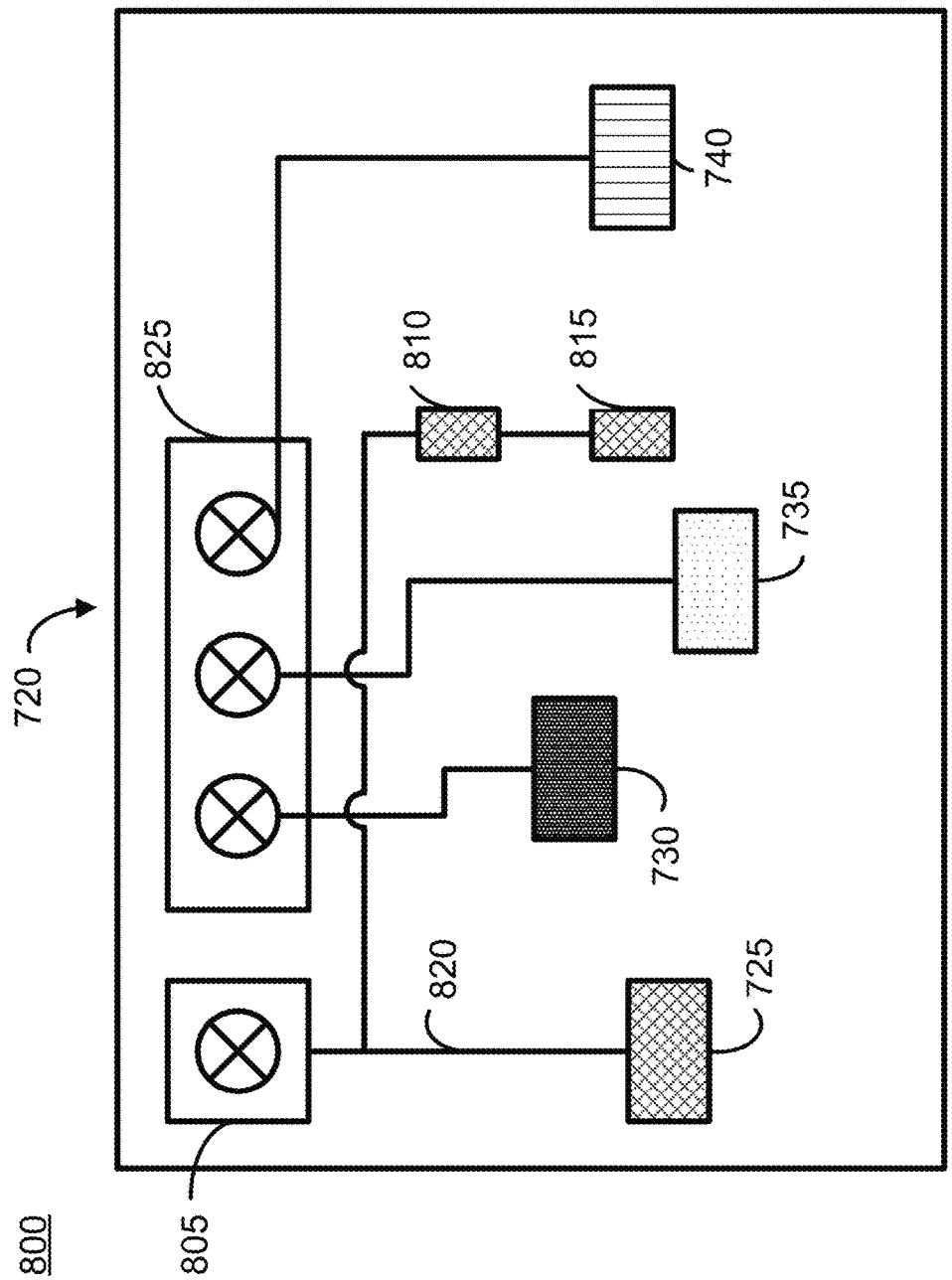
FIG. 8 illustrates the coupling of a prefabricated wall panel with electrical conduits and network lines, according to one embodiment.

FIG. 8 illustrates one embodiment of the coupling of a prefabricated wall panel 720 with electrical conduits and network lines. As discussed above, prefabricated panels may include both power outlets and network outlets. Power outlets and network outlets are prefabricated into wall panels such that they can couple to adjacent panels during assembly of the modular dwelling unit. In some embodiments, prefabricated panels have electrical junctions wired to the power outlets and additional electrical junctions wired to the network outlets. The electrical junction coupled to the network outlets enable the flow of data from a network hub, such as a smart home hub, to the network outlets. Electrical junctions may include a junction box with one or more connectors and a coupling interface such that the corresponding prefabricated panel of a coupling interface can couple with a reciprocal coupling interface of an electrical junction of an adjacent prefabricated panel.

The illustration 800 shows two electrical junctions. The first electrical junction 805 is electrically coupled to the doorbell 725 and to two power outlets, power outlet 810 and power outlet 815 through electrical conduits, e.g., electrical conduit 820. The first electrical junction 805 may provide a standard power voltage (e.g., 110V AC) to the power outlets it is coupled with. The second electrical junction 825 includes a group of connectors that are each connected to a network outlet through a network line. As shown, the second electrical junction 825 includes connectors coupled to a light fixture 730, control panel 735, and an ethernet port 740. The second electrical junction 825 enables data to flow from the network lines to each of the network outlets. The second electrical junction 825 may also enable the flow of electricity (e.g., low voltage electricity) to each of the network outlets. As shown, the second electrical junction 825 includes a dedicated connector for each network outlet. However, in alternative embodiments, a connector of the electrical junction may be coupled to more than one network outlet.

Figure 9:
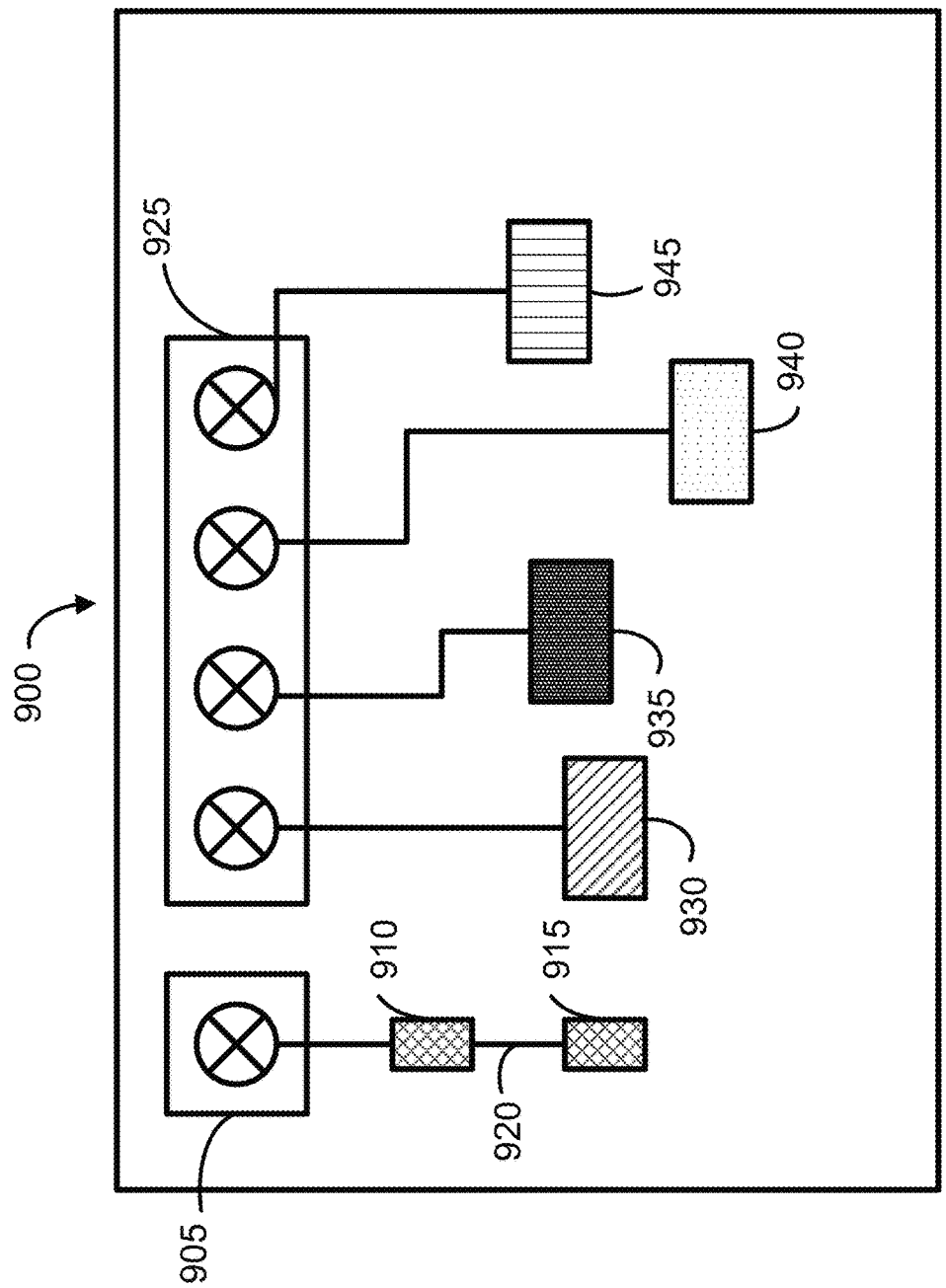
FIG. 9 illustrates an example of a prefabricated wall panel, according to one embodiment.

FIG. 9 illustrates an example embodiment of a prefabricated wall panel 900. Prefabricated panels may include both power outlets and network outlets. Power outlets and network outlets are prefabricated into wall panels such that they can couple to adjacent panels during assembly of a modular dwelling unit. In some embodiments, prefabricated panels have electrical junctions wired to the power outlets and additional electrical junctions wired to the network outlets, as shown in FIG. 9.

The wall panel 900 illustrated in FIG. 9 includes two electrical junctions. The first electrical junction 905 is electrically coupled to two power outlets, power outlet 910 and power outlet 915 through electrical conduits, e.g., electrical conduit 920. The first electrical junction 905 may provide a standard power voltage (e.g., 110V AC) to the power outlets it is coupled with. The second electrical junction 925 includes a group of connectors that are each connected to a network outlet through a network line. As shown, the second electrical junction 925 includes connectors coupled to a doorbell 930, a light fixture 935, a control panel 940, and an ethernet port 945. The second electrical junction 925 enables data to flow from the network lines to each of the network outlets. The second electrical junction 925 may also enable the flow of electricity (e.g., low voltage electricity) to each of the network outlets. As shown, the second electrical junction 925 includes a dedicated connector for each network outlet. However, in alternative embodiments, a connector of the electrical junction may be coupled to more than one network outlet, as discussed with reference to FIG. 10.

Figure 10:
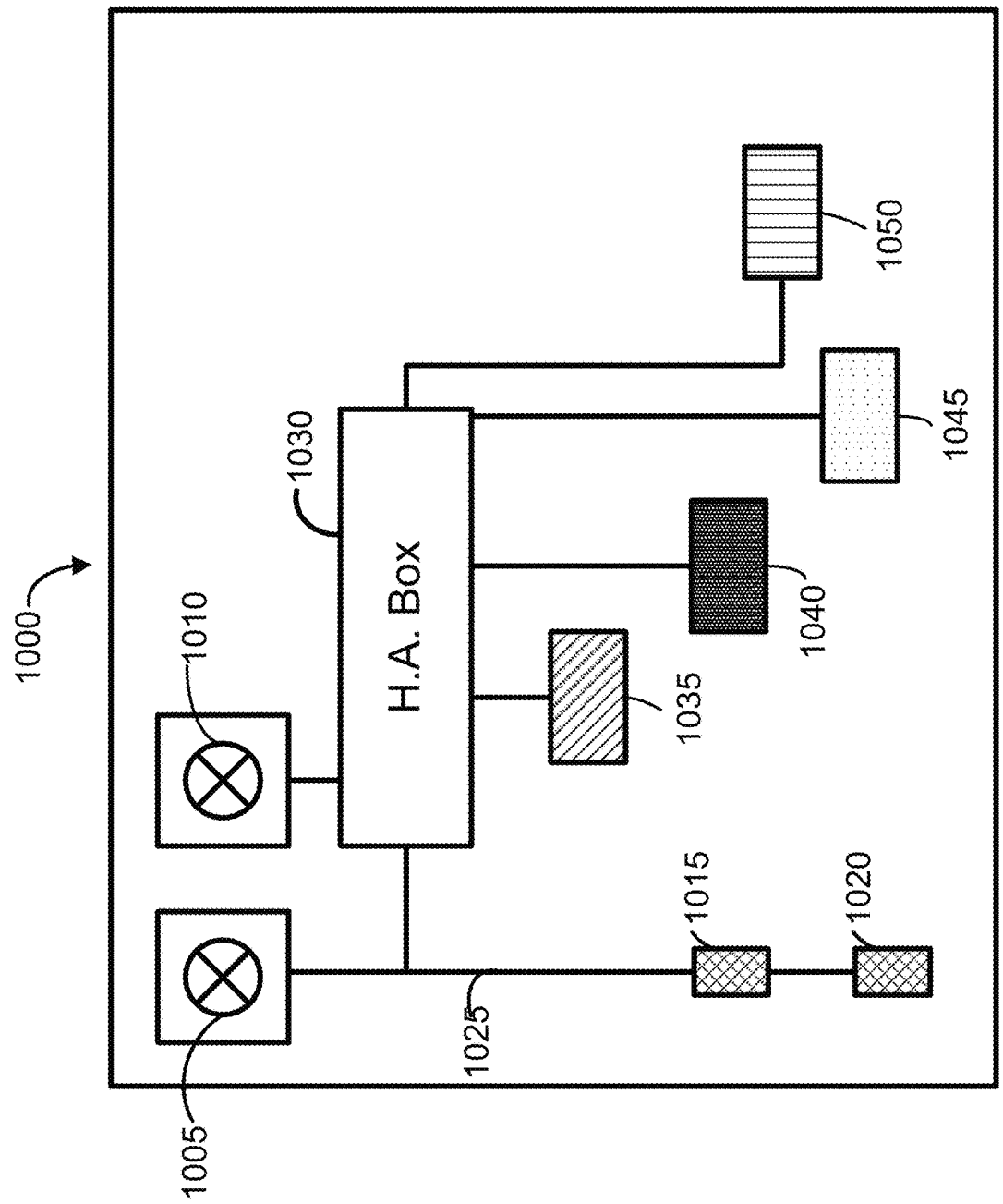
FIG. 10 illustrates an additional example of a prefabricated wall panel, according to one embodiment.

FIG. 10 illustrates an additional example embodiment of a prefabricated wall panel. The prefabricated wall panel 1000 shown includes two electrical junctions, and each junction includes one electrical connector, e.g., the first electrical connector 1005 and the second electrical connector 1010. The electrical connector 1005 may provide a standard power voltage to the power outlets it is coupled with. As shown, the electrical connector 1005 is electrically coupled to two power outlets, power outlet 1015 and power outlet 1020 through electrical conduits, e.g., electrical conduit 1025. The second electrical connector 1010 enables the flow of data within the prefabricated wall panel 1000. Both the first electrical connector 1005 and the second electrical connector 1010 are connected to a home automation box 1025. The home automation box 1030 receives power from the first electrical junction 1005 and data from the second electrical junction 1010. The home automation box 1030 utilizes the data to control the utilities within the prefabricated wall panel 1020, e.g., a doorbell 1035, light fixture 1040, control panel 1045, and ethernet port 1050.

Figure 11:
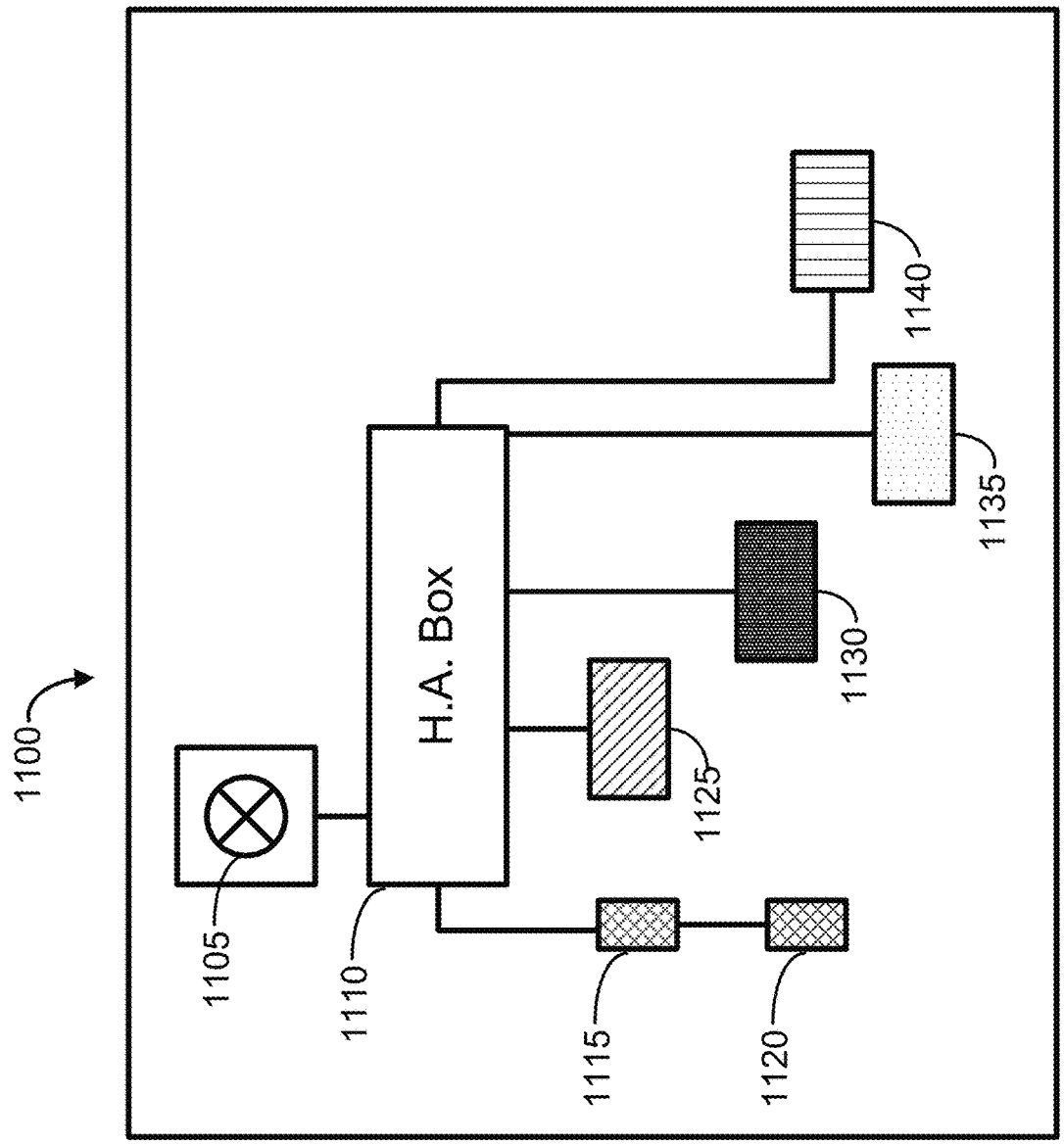
FIG. 11 illustrates an additional example a prefabricated wall panel, according to one embodiment.

FIG. 11 illustrates an additional example embodiment a prefabricated wall panel 1100. In the embodiment shown, the single connector 1105 of the prefabricated wall panel 1100 provides both power and data to the prefabricated wall panel over a single conduit (or a plurality of conduits combined into a single connector) using a power line communication (PLC) protocol. Using the PLC protocol, data signals can be encoded within the power signals, beneficially enabling a controller, such as the home automation box 1110 to decode the data signals received from the connector 1105 from the power signals.

The home automation box 1110, after decoding the data signals, can use the data signals to control the utilities within the prefabricated wall panel 1100. The utilities in the prefabricated wall panel 1100 shown include two power outlets, namely power outlet 1115 and power outlet 1120, a doorbell 1125, a light fixture 1130, a control panel 1135, and an ethernet port 1140. In some embodiments, information received from the utilities (such as doorbell signals, light levels, ethernet data, and the like) can be provided back to the home automation box 1110, which can encode the information into data signals for transmission back through the single connector 1105 within the power signals.

By combining data and power signals within a single conduit, the prefabricated wall panel 1100 can include just the single connector 1105. This simplifies manufacturing of the prefabricated wall panel 1100, it simplifies assembly of a structure using the prefabricated wall panel (since connecting the wall panel to other wall panels requires coupling only the single connector 1105 and not multiple connectors), and it centralizes all data and power transmission within the structure. Accordingly, the use of a single connector 1105 can reduce the cost and difficulty of both manufacturing and assembling prefabricated wall panels or structures made of the prefabricated wall panels.

CONCLUSION

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

What is claimed is:

1. A modular dwelling unit comprising:
a plurality of prefabricated wall panels, each prefabricated wall panel comprising:
an electrical junction with a coupling interface such that the prefabricated wall panel is configured to couple to a second prefabricated wall panel via the coupling interface and a reciprocal coupling interface of the second prefabricated wall panel,
an electrical conduit embedded within the prefabricated wall panel coupled to the electrical junction and configured to enable the flow of electricity and data signals from the electrical junction and through the electrical conduit, and
one or more power outlets coupled to the electrical conduit;
wherein at least one prefabricated wall panel includes a controller configured to decode data signals from the electricity flowing through electrical conduit and to control one or more devices embedded within the prefabricated wall panel based on the decoded data signals;
a prefabricated ceiling panel, the prefabricated ceiling panel including a central electrical junction and a plurality of exterior electrical junctions, each of the plurality of exterior electrical junctions electrically coupled to the central electrical junction and electrically coupled to an electrical junction of a prefabricated wall panel upon assembly of the modular dwelling unit, wherein the central electrical junction is serially coupled to an adjacent central electrical junction of an adjacent prefabricated ceiling panel; and
a breaker panel, the breaker panel electrically coupled to the central electrical junction of the prefabricated ceiling panel via a feeder line such that electricity flows from the breaker panel, through the central electrical junction of the prefabricated ceiling panel, from the central electrical junction of the prefabricated ceiling panel, from the central electrical junction of the prefabricated ceiling panel to the adjacent central electrical junction of the adjacent ceiling panel, and through the plurality of exterior electrical junctions of the prefabricated ceiling panel, from the plurality of exterior electrical junctions and through the electrical conduit within each prefabricated wall panel, and from the electrical conduit within each prefabricated wall panel through to the one or more power outlets of each of the prefabricated wall panels.

2. The modular dwelling unit of claim 1, wherein each of the plurality of prefabricated wall panels further includes one or more network lines, each of the one or more network lines coupled to an additional electrical junction of the prefabricated wall panel and to one or more network outlets within the prefabricated wall panel, the one or more network lines configured to enable the flow of data from the additional electrical junction, through the one or more network lines, to the one or more network outlets.

3. The modular dwelling unit of claim 2, wherein the additional electrical junction of the prefabricated wall is communicatively coupled to a smart home hub of the modular dwelling unit.

4. The modular dwelling unit of claim 2, wherein the one or more network lines are ethernet lines.

5. The modular dwelling unit of claim 2, wherein the one or more network lines are further configured to enable the flow of electricity from the additional electrical junction, through the one or more network lines, to the one or more network outlets, wherein a voltage of electricity carried by the one or more network lines is lower than a voltage of electricity carried by the electrical conduit.

6. The modular dwelling unit of claim 1, wherein each of the plurality of prefabricated wall panels further includes one or more plumbing pipes, the one or more plumbing pipes each including a coupling interface to connect to one or more plumbing pipes in an additional prefabricated wall panel.

7. The modular dwelling unit of claim 1, further comprising a utility wall, the utility wall comprising an electrical conduit electrically coupled to the breaker panel and to each of a plurality of additional power outlets, each of the additional power outlets corresponding to a fixed electrical system within the modular dwelling unit.

8. The modular dwelling unit of claim 7, wherein the utility wall includes one or more plumbing pipes, wherein the one or more plumbing pipes include a coupling interface configured to connect to one or more water systems within the module dwelling unit.

9. The modular dwelling unit of claim 1, wherein the breaker panel is located on an exterior wall panel of the modular dwelling unit.

10. The modular dwelling unit of claim 1, wherein the breaker panel is located on an interior wall panel of the modular dwelling unit.

* * * * *